Dec. 19, 1944.   S. E. HILL   2,365,407
CUTTER HEAD
Filed Jan. 9, 1942   2 Sheets-Sheet 1
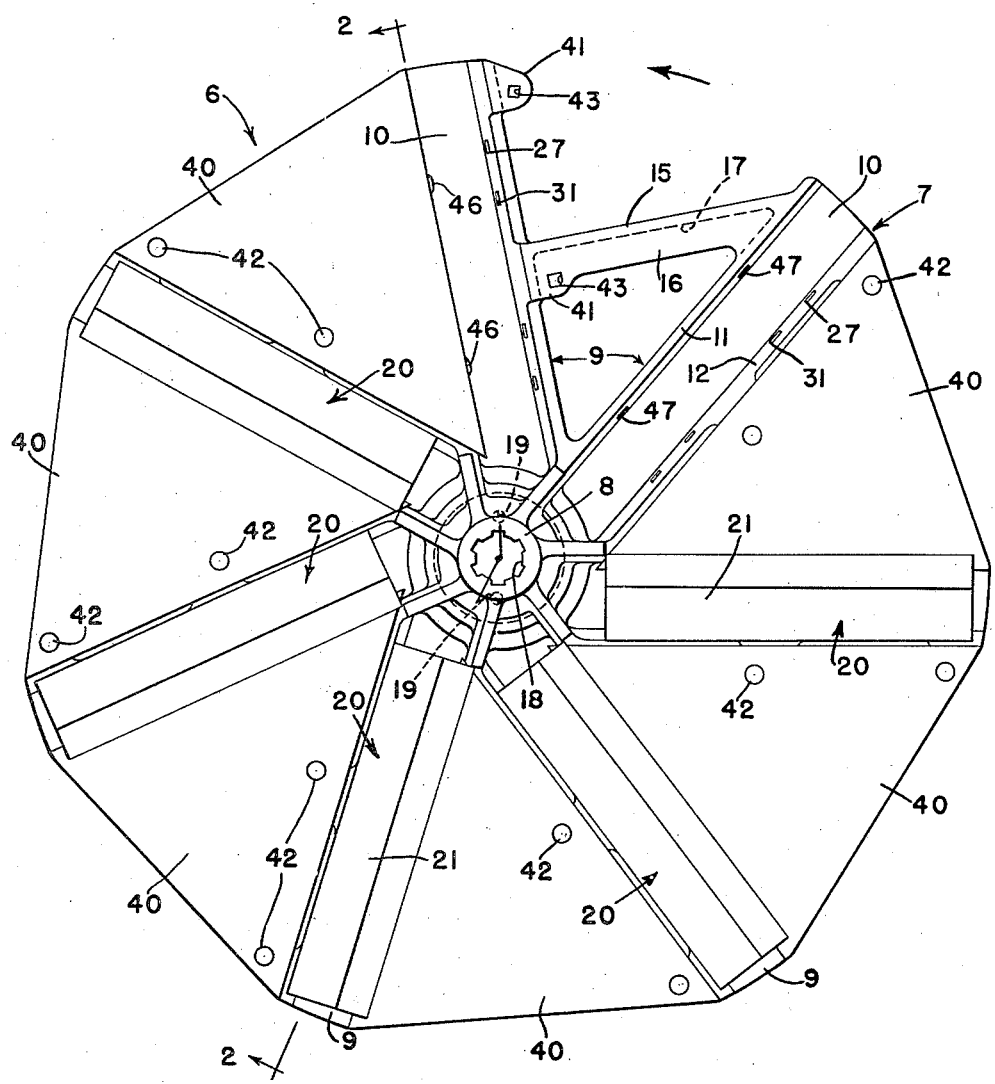
FIG. 1
INVENTOR
Stanley E. Hill
ATTORNEYS Dec. 19, 1944.  S. E. HILL  2,365,407
CUTTER HEAD
Filed Jan. 9, 1942  2 Sheets-Sheet 2
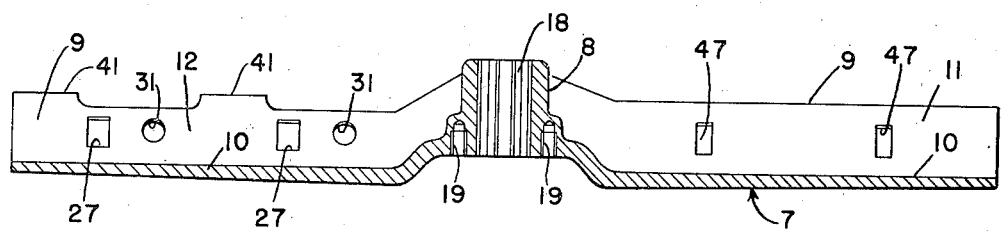
FIG. 2
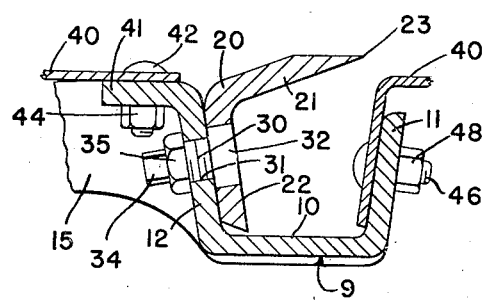
FIG. 5
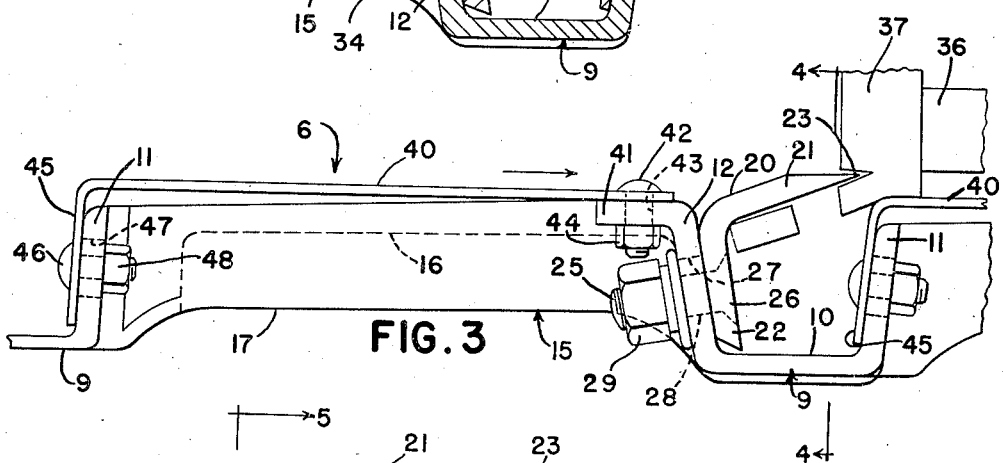
FIG. 3
FIG. 4
INVENTOR
Stanley E. Hill
BY
ATTORNEYS Patented Dec. 19, 1944

2,365,407

UNITED STATES PATENT OFFICE 2,365,407

CUTTERHEAD

Stanley E. Hill, East Moline, Ill., assignor to Deere & Company, Moline, Ill., a corporation of Illinois Application January 9, 1942, Serial No. 426,193

10 Claims. (Cl. 146—106)

The present invention relates generally to chopping mechanism of the type which employs a rotary cutter head for the purpose of disintegrating or comminuting material of any sort, such as for example, a machine for the purpose of chopping corn or other harvested crops into ensilage. The principal object of my invention relates to the provision of a novel and improved cutter head which is light in weight but strong and durable in operation. More specifically, my invention particularly relates to that type of cutter head known as the flywheel type, in which one or more knife blades are supported on a rotary frame in a generally radially extending position in which the cutting edge revolves in a plane generally perpendicular to the axis of rotation, and is in the nature of an improvement on the machine shown in Patent 2,188,522, granted to Alfs, January 30, 1940, to which reference may be had for a complete description of one machine to which a cutter head embodying the principles of the present invention, may be applied.

A further object of my invention relates to the provision of a cutter head which also serves as a propeller for throwing the pieces of chopped material radially outwardly at a high velocity, which permits the material to be conducted by a suitable duct to a bin or container. In this connection, a further object relates to the provision of a knife blade having an angularly disposed flange which is adapted to engage the cut material for throwing the same outwardly of the cutter head. Thus, the knife is subjected not only to the wear on the cutting edge, but also takes the wear occasioned by the friction of the cut material sliding outwardly along the blade, and hence, by replacing the knives after an extended period of operation, it is possible to renew all of the parts which are subject to maximum wear.

Still another object of my invention relates to the provision of novel means for mounting and adjusting the knives. A further object relates to the provision of novel means for gauging the fineness of the cut material.

These and other objects and advantages of my invention will be apparent to those skilled in the art after a consideration of the following description, in which reference is made to the drawings appended hereto, in which Figure 1 is a plan view of a cutter head embodying the principles of the present invention, from which two of the knives and one of the gauging pans have been removed to more clearly show the details of construction of the rotor frame;

Figure 2 is a sectional elevational view taken along a line 2—2 in Figure 1;

Figure 3 is a fragmentary elevational view at the end of one of the rotor arms, showing the manner of operation of the knives and gauging pans;

Figure 4 is a sectional elevational view of one of the rotor arms with one of the knives mounted thereon; and Figure 5 is a sectional elevational view taken along a line 5—5 in Figure 4.

Referring now to the drawings, reference numeral 6 indicates in its entirety the rotary cutter head, which comprises a rotary frame 7 of the flywheel type, and preferably formed of cast metal in one integral piece. The frame 7 comprises a hub portion 8 and a plurality of arms 9, which are generally radially disposed with respect to the hub but with the outer ends of the arms trailing slightly behind an exact radial position in order to impart a slicing action of the blades against the material to be cut. Each of the arms 9 is in the shape of a channel member, the open sides of the channels facing axially in one direction, that is to say, upwardly as viewed in the drawings. Each channel-shaped arm 9 includes a generally horizontally disposed bottom portion 10 and a pair of leading and trailing longitudinal flanges 11, 12, respectively, disposed generally vertical but inclined slightly outwardly along the sides of the arms. The outer end of each arm 9 is braced by means of a brace or strut 15, connected at one end adjacent the outer end of the arm and extending forwardly to approximately the midpoint of the adjacent arm, and is preferably integrally formed with the two arms. Each pair of adjacent arms is thus interconnected. Each of the braces 15 is of L-shaped cross section and has a horizontal flange 16 and a vertical flange 17 extending downwardly therefrom.

The hub 8 is provided with internal splines 18 adapted to receive a suitable splined shaft (not shown) by means of which the cutter head is driven in a counterclockwise direction as viewed in Figure 1. A pair of tapped recesses 19 are provided in the hub for receiving cap screws by means of which the cutter head can be firmly secured to a suitable driving head (not shown).

Each of the outwardly extending arms 9 is adapted to receive and support an angular chopping knife 20. Each of the knives 20 is of angular or L-shaped cross section providing a pair of blade or flange portions 21, 22 disposed approximately at right angles to each other and joined along a line extending longitudinally thereof. Preferably, each knife is formed of a single piece of metal bent longitudinally to form the L-shaped blade. One of the blade portions 21 of each knife 20 is beveled to provide a sharp cutting edge 23 extending along the edge of the inner face of the blade portion 21.

Each knife 20 is supported on one of the arms 9 by means of a pair of plow bolts 25 having flat circular heads 26 countersunk within the supporting flange 22 of the knife and extending through vertically disposed oblong openings 27 in the trailing flange 12 of the arm 9. The shanks 28 of the plow bolts 25 are square and fit slidably within the oblong openings 27, in order to permit the bolts to slide vertically therein but to be held against rotation relative thereto. This permits the knife to be adjusted vertically relative to its supporting arm 9 and when so adjusted, can be securely fixed in adjusted position by a nut 29 on each bolt 25.

Adjusting means are provided for positively shifting the knives 20 relative to the arms 9, in the form of adjusting bolts 30, which are rotatable within apertures 31 in the flange 12. The bolts have circular heads 32 eccentrically disposed with respect to the shanks of the bolts 30 and rigidly fixed thereto. The heads 32 of the bolts 30 lie against the inner side of the flange 12 and within a pair of slots 33 in the supporting flange 22 of the knife 20. The opposite end of each bolt 30 is provided with a square portion 34 adapted to receive a wrench for the purpose of rotating the bolts within the apertures 31, with the result that rotation of the eccentric heads 32 causes the knife 20 to be shifted thereby generally vertically against the side of the flange 12 of the arm 9. The knife 20 is retained in adjusted position by means of a lock nut 35, which engages the threaded shank of the bolt 30 on the outer side of the flange 12.

As shown in Figure 3, the knife 20 is disposed within the channel-shaped arm 9 with the supporting flange 22 fixed to the flange 12 of the arm and the cutting flange 21 extending forwardly and upwardly therefrom, with the knife edge 23 in a leading position over the open side of the channel and spaced therefrom in an axial direction. The cutting edge 23 is adapted to cooperate with a stationary cutter bar 36, which is supported by suitable means (not shown) which form no part of the present invention, directly above the beveled face of the knife blade 21. Reference numeral 37 indicates a corn stalk or other piece of material to be chopped by the knife 20, cooperating with the stationary cutter bar 36.

The fineness of cut is determined by a plurality of segment-shaped sheet metal gauging pans 40, which fill the open spaces between the arms 9. The leading edge of each sheet metal pan member 40 is secured to a pair of lugs 41, extending generally horizontally rearwardly from the upper edge of flange 12 of each arm 9 directly in back of the knife 20. The pan member 40 is fastened to the lugs 41 by means of a pair of conventional carriage bolts 42 having rounded heads and square shanks which extend through square openings 43 in the lugs 41 and prevent the bolts 42 from turning. The bolts 42 are secured by nuts 44. Each of the inner lugs 41 is formed integrally with the forward end of the bracing strut 15, as best shown in Figure 1.

The trailing edge of each pan 40 is provided with a downwardly turned flange 45, which lies against the inner side of the leading flange 11 on the adjacent arm 9, and the flange 45 of the pan 40 is fixed to the arm flange 11 by means of a pair of conventional carriage bolts 46 which extend through vertically extending oblong apertures 47. Thus, the trailing edges of the gauging pans 40 can be adjusted from a low position in which the pans lie flat against the top flanges 16 of the braces 15, to a high position almost on a level with the cutting edges 23 of the knives 20. The pans are secured in any position of adjustment by means of nuts 48 which can be tightened on the bolts 46 to clamp the flanges 45 securely to the arms 9. In Figure 3 the pans 40 are shown in an intermediate position and the size of the pieces cut from the cornstalk 37 or other material are gauged by the amount of offset between the cutting edge 23 and the top of the pan 40.

During operation the cutter head 6 revolves about the axis of the hub 8 at a high rate of speed, causing the cut pieces of material to be thrown outwardly through the channel-shaped arms 9 and out of the outer ends of the latter, where the pieces are conveyed by suitable duct means to a bin, as disclosed in the above-mentioned patent. As the pieces slide outwardly through the arms 9 they slide against the inner surface of flange 22 of the knife 20. Thus all of the wear due to cutting and propelling of the material is taken by the knives 20, so that when the cutting flange 21 has been ground down during sharpening operations until the knife needs replacing, the supporting flange 22 is well worn by the friction of the sliced material. Both of these points of maximum wear are therefore renewed when a new knife is installed.

I claim:

1. A rotary cutter head of the flywheel type comprising a central hub, a plurality of knife supporting arms extending outwardly therefrom and rigidly connected thereto, a pan member fixedly supported on each arm and extending to the adjacent arm, the edge of said pan member being adjustable axially relative to said adjacent arm, and means for fixing said pan members to said arms in any position of axial adjustment.

2. A rotary cutter head of the flywheel type comprising a central hub, a plurality of arms extending outwardly therefrom and rigidly connected thereto, a knife extending outwardly along each of said arms and attached thereto, the edges of said knives lying substantially in a common plane of rotation, and a segment shaped pan member between each pair of adjacent arms, each of said pan members being fixed to one arm adjacent the back of one of the knife blades and terminating adjacent the proximate knife edge along a line spaced axially from the latter, the last named edge of said pan being adjustably axially toward and away from the associated knife edge to regulate the fineness of cut, and means for fixing said pans relative to said arms in any position of axial adjustment.

3. A rotary cutter head comprising a central hub, a plurality of channel-shaped arms fixed thereto and extending outwardly therefrom with the open sides of said arms facing in one axial direction, a knife extending outwardly along each of said arms and attached thereto, the edge of said knife being spaced axially from said open sides, whereby material cut by each knife is thrown outwardly between the two flanges of the associated arm by centrifugal force, a gauging member underlying each knife to determine the thickness of cut, and adjustable means for fixing said gauging member to said arms providing for axial adjustment of each gauging member relative to its associated knife for regulating the thickness of cut.

4. A rotary cutter head comprising a central hub, a plurality of channel-shaped arms fixed thereto and extending outwardly therefrom with the open sides of said arms facing in one axial direction, a knife extending outwardly along each of said arms and attached thereto, the edge of said knife being spaced axially from said open sides, whereby material cut by each knife is thrown outwardly through the associated arm by centrifugal force, and a segment shaped pan member between each pair of adjacent arms, each of said pan members being fixed to one arm adjacent the back of one of the knife blades and terminating adjacent the proximate knife edge along a line spaced axially from the latter, the last named edge of said pan being adjustable axially toward and away from the associated knife edge to regulate the fineness of cut, and means for fixing said pans relative to said arms in any position of axial adjustment.

5. A rotary cutter head comprising a central hub, a plurality of channel-shaped arms fixed thereto and extending outwardly therefrom with the open sides of said arms facing in one axial direction, a knife extending along each of said arms and attached to one of the flanges thereof, the edges of said knives lying substantially in a common plane of rotation and spaced axially outwardly from the edges of said channel-shaped arms, and a segment shaped pan member between each pair of adjacent arms, each of said pan members having its leading edge fixed to the knife supporting flange of one arm and extending to the proximate arm inwardly of the edge of the knife on the latter, a flange along the trailing edge of each pan lying against the flange of the proximate arm opposite the knife supporting flange of the latter and adjustable relative thereto in an axial direction, and means for detachably securing said pan flange to said last mentioned arm flange in any of several adjusted positions to determine the fineness of cut.

6. A rotary cutter head comprising a central hub, a plurality of channel-shaped arms fixed thereto and extending outwardly therefrom with the open sides of said arms facing in one axial direction, an angular knife blade extending along each of said arms, each knife having a supporting portion lying against and fixed to one flange of its supporting arm and a cutting portion extending in the direction of rotation from said supporting portion provided with a leading cutting edge disposed outwardly of the open side of said arm, and a segment shaped pan member between each pair of adjacent arms, each of said pan members having its leading edge fixed to the knife supporting flange of one arm and extending to the proximate arm inwardly of the edge of the knife on the latter, a flange along the trailing edge of each pan lying against the flange of the proximate arm opposite the knife supporting flange of the latter and adjustable relative thereto in an axial direction, and means for detachably securing said pan flange to said last mentioned arm flange in any of several adjusted positions to determine the fineness of cut.

7. A rotary cutter head of the flywheel type comprising a central hub, a plurality of knife supporting arms extending outwardly therefrom and rigidly connected thereto, a bracing leg connected to the middle portion of each of said arms and extending to a point of connection with an adjacent arm near the outer end thereof, and a sheet metal pan member between each pair of adjacent arms, each pan member being attached to said arms and disposed to lie over said leg, the latter being apertured to receive means for securing said pan member.

8. A rotary cutter head of the flywheel type comprising a central hub, a plurality of knife supporting arms extending outwardly therefrom and rigidly connected thereto, a plurality of knives extending outwardly along said arms, respectively, and having cutting edges adapted to lie in a common plane of revolution, adjustable means for fixing said knives to said arms providing for axial adjustment of each knife relative to said arms to permit readjusting said knives into said common plane after said knives have become worn, a gauging member underlying each knife to determine the thickness of cut, and adjustable means for fixing said gauging member to said arms providing for axial adjustment of each gauging member relative to its associated knife for regulating the thickness of cut.

9. A rotary cutter head comprising a central hub, a plurality of channel-shaped arms fixed thereto and extending outwardly therefrom with the open sides of said arms facing in one axial direction, a knife extending along each of said arms and having cutting edges adapted to lie in a common plane of revolution, adjustable means for fixing said knives to one of the flanges thereof providing for axial adjustment of each knife relative to said arms to permit readjusting said knives into said common plane after said knives have become worn, a gauging member underlying each knife to determine the thickness of cut, and adjustable means for fixing said gauging member to the other flange providing for axial adjustment of each gauging member relative to its associated knife for regulating the thickness of cut.

10. The combination set forth in claim 8, including the further provision that said adjustable means for each of said knives comprises bolt means extending through aligned apertures in said knife and its supporting arm, one of said apertures being enlarged to provide a limited amount of shifting of said knife relative to said arm, and means for optionally shifting said knife comprising a part rotatably mounted on said arm and having an eccentric head portion engageable with said knife, whereby the latter can be shifted by rotating said part and secured in adjusted position by tightening said bolt means.

STANLEY E. HILL.